US011960369B2

(12) United States Patent
Zeltwanger et al.

(10) Patent No.: US 11,960,369 B2
(45) Date of Patent: Apr. 16, 2024

(54) EFFICIENT CREATION OF A SECONDARY DATABASE SYSTEM

(71) Applicant: International Business Machines Corporation, Armonk, NY (US)

(72) Inventors: Hans-Jürgen Zeltwanger, Weinsberg (DE); Karl Fleckenstein, Malsch (DE); Jens Peter Seifert, Gaertringen (DE); Martin Jungfer, Ostelsheim (DE); Thomas Rech, Rittersheim (DE); Alexander Zietlow, Sandhausen (DE); Dirk Nakott, Stuttgart (DE); Holger Hellmuth, Hellmuth (DE)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 17/511,018

(22) Filed: Oct. 26, 2021

(65) Prior Publication Data

US 2023/0128784 A1  Apr. 27, 2023

(51) Int. Cl.
| | | |
|---|---|---|
| G06F 11/00 | (2006.01) | |
| G06F 11/20 | (2006.01) | |
| G06F 16/21 | (2019.01) | |
| G06F 16/2455 | (2019.01) | |
| G06F 16/27 | (2019.01) | |

(52) U.S. Cl.
CPC ........ *G06F 11/2028* (2013.01); *G06F 16/214* (2019.01); *G06F 16/24568* (2019.01); *G06F 16/27* (2019.01)

(58) Field of Classification Search
CPC ............... G06F 11/2028; G06F 16/214; G06F 16/24568; G06F 16/27

(Continued)

(56) References Cited

U.S. PATENT DOCUMENTS

| | | |
|---|---|---|
| 7,321,904 B2 | 1/2008 | Holenstein |
| 9,703,634 B2 | 7/2017 | Kandukuri |

(Continued)

FOREIGN PATENT DOCUMENTS

| | | |
|---|---|---|
| CN | 1700181 A | 11/2005 |
| CN | 106855860 A | 6/2017 |

(Continued)

OTHER PUBLICATIONS

International Search Report and Written Opinion dated Jan. 28, 2023 from International Application No. PCT/IB2022/060232 filed Oct. 25, 2022.

(Continued)

*Primary Examiner* — Sarai E Butler
(74) *Attorney, Agent, or Firm* — Brian M. Restauro; David K. Mattheis

(57) ABSTRACT

A method for generating a copy of a database using a data streaming protocol is disclosed. The method comprises setting up a structure of a secondary database, prioritizing data objects to be copied from a primary database to the secondary database, copying data objects from the primary database to the secondary database using a data streaming protocol, restoring data corresponding to the data object in the secondary database in parallel to copying data objects from the primary database to the secondary database, applying changes made to the data corresponding to the data object in the primary database during the time of copying, after the data object has been copied, and making available the secondary database for usage once all data objects have been copied from the primary database to the secondary database so that a usable copy of the primary database is created.

25 Claims, 9 Drawing Sheets

(58) Field of Classification Search
USPC ........................................................ 714/1–57
See application file for complete search history.

(56) References Cited

U.S. PATENT DOCUMENTS

| | | | |
|---|---|---|---|
| 9,766,987 B2 | 9/2017 | Kumarasamy | |
| 2002/0112198 A1* | 8/2002 | Lim | G06F 11/1417 |
| | | | 714/E11.133 |
| 2005/0055351 A1* | 3/2005 | Barton | G06F 16/23 |
| 2005/0165851 A1* | 7/2005 | Goyal | G06F 11/2074 |
| 2005/0193248 A1* | 9/2005 | Idei | G06F 11/2074 |
| | | | 714/E11.107 |
| 2008/0046400 A1* | 2/2008 | Shi | H04L 67/1001 |
| | | | 707/E17.046 |
| 2013/0297976 A1* | 11/2013 | McMillen | H04L 43/10 |
| | | | 714/43 |
| 2015/0378830 A1* | 12/2015 | Hoobler, III | G06F 11/1458 |
| | | | 707/648 |
| 2016/0321341 A1 | 11/2016 | Ramamurthi | |
| 2018/0121292 A1* | 5/2018 | Kosaraju | G06F 11/1461 |
| 2019/0102411 A1 | 4/2019 | Hung et al. | |
| 2020/0356873 A1* | 11/2020 | Nawrocke | G06F 11/3409 |

FOREIGN PATENT DOCUMENTS

| | | | |
|---|---|---|---|
| CN | 111177260 A | 5/2020 | |
| EP | 0394019 A2 | 10/1990 | |
| WO | 2023073547 A1 | 5/2023 | |

OTHER PUBLICATIONS

"Data aware optimized backups—Object & System level", An IP.com Prior Art Database Technical Disclosure, IP.com No. IPCOM000246384D, IP.com Electronic Publication Date: Jun. 2, 2016, 7 pps., <https://priorart.ip.com/IPCOM/000246384>.

"High availability disaster recovery (HADR)" Db2 11.5, © Copyright IBM Corporation 2019, 2021, 3 pps., <https://www.ibm.com/support/knowledgecenter/SSEPGG_11.5.0/com.ibm.db2.luw.admin.ha.doc/doc/c0011267.html>.

"Managing a Physical Standby Database", Oracle Help Center, Oracle Database Online Documentation, 10g Release 2 (10.2), Copyright © 2021, 16 pps., <https://docs.oracle.com/cd/B19306_01/server.102/b14239/manage_ps.htm#i1014482>.

"Setting Up a Replicated System", Oracle Help Center, Oracle Database Online Documentation 12c, Release 1 (12.1), Copyright © 2012, 2014, Oracle and/or its affiliates, 13 pps., <https://docs.oracle.com/database/121/TTREP/setup.htm#TTREP423>.

Bartkowski et al., "High Availability and Disaster Recovery Options for DB2 for Linux, UNIX, and Windows", An IBM Redbooks publication, Published Oct. 11, 2012, updated Oct. 18, 2012, 584 pps., <http://www.redbooks.ibm.com/abstracts/sg247363.html?Open>.

Nagothi, "Configuring PostgreSQL for Business Continuity", Severalnines, 10 pps., © Copyright 2014-2021. Severalnines AB, All rights reserved, <https://severalnines.com/database-blog/configuring-postgresql-business-continuity>.

* cited by examiner

EFFICIENT CREATION OF A SECONDARY DATABASE SYSTEM

FIELD OF THE INVENTION

The present invention relates generally to generating a copy of a database, and more specifically, to using a data streaming protocol for generating a copy of a database.

BACKGROUND

Data management and ensuring data access through a variety of enterprise applications are among the main goals of any enterprise IT (information technology) organization. The amount of data assets is an ever-growing challenge and needs to be managed carefully and consistently. The efficient creation of a database in a database management system (DBMS) as a copy (secondary database) of an existing (primary) database may be seen as the key to optimizing operational scenarios, such as moving existing content to a different location, creating additional copies of a production system, enabling a high level of availability, and providing a disaster recovery (HA DR) environment.

Building the secondary databases is usually a manual and time-consuming process, and for cloud-based and other environments, the efficient creation of secondary databases leads to an operational advantage and thus reduces costs. Furthermore, in the areas of big data, machine-learning, and artificial intelligence, the usage and storage of data volumes is constantly growing, which can increase the duration and effort of setting up secondary databases. In many instances, it is preferred that the creation of a secondary database take place completely online and in the background of production operations.

SUMMARY OF THE INVENTION

According to one aspect of the present invention, a computer-implemented method for generating a copy of a database using a data streaming protocol is provided. The method provides for one or more processors setting up a structure of a secondary database identical to the primary database. The one or more processors prioritize data objects to be copied from a primary database to the secondary database. The one or more processors copy data objects from the primary database to the secondary database using a data streaming protocol for the prioritized data objects. The one or more processors restore the data objects in the secondary database in parallel with copying of the data objects from the primary database to the secondary database. The one or more processors apply changes made to the data corresponding to the data objects in the primary database during the time of copying of the data objects to corresponding items in the secondary database, subsequent to the copying of the data objects to the secondary database.

BRIEF DESCRIPTION OF THE SEVERAL VIEWS OF THE DRAWINGS

Embodiments of the invention will be described herein, by way of example and with reference to the following drawings.

DETAILED DESCRIPTION

Figure 1:
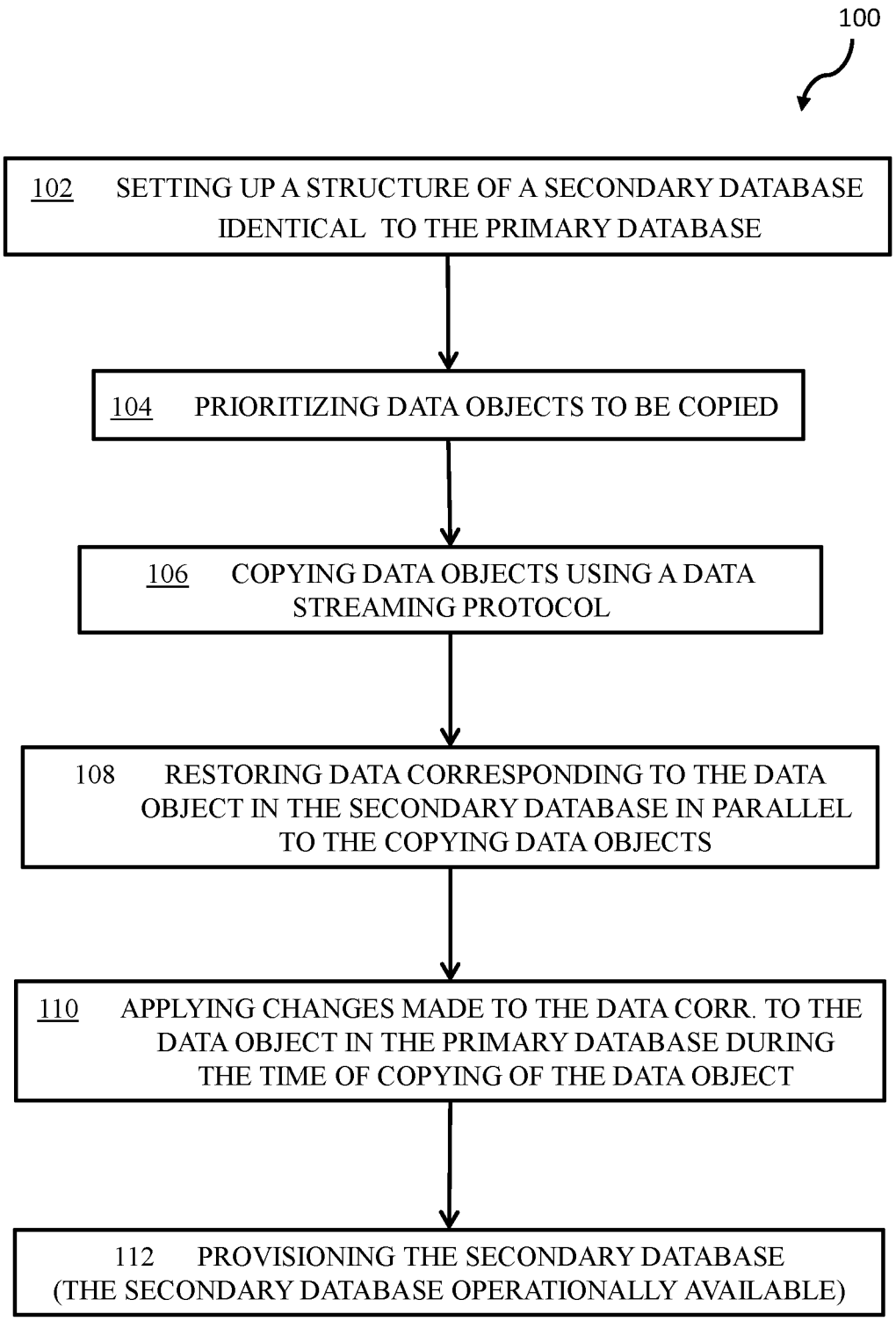
FIG. 1 depicts a block diagram of an embodiment of the computer-implemented process for generating a copy of a database using a data streaming protocol.

In the context of this description, the following conventions, terms and/or expressions may be used:

The term "copy of a database" may denote here, that a direct copy or clone of a primary database is generated to build the secondary database, and the secondary database is also referred to, herein, as the "standby," and/or the "standby database."

The term "data streaming protocol" may denote in particular, a real-time streaming protocol (RTSP). The term may describe a network control protocol designed for a typical use in entertainment and communication systems controlled streaming media servers. The protocol may typically be used for establishing and controlling media session between endpoints. Thereby, clients of media servers issue command such as "play", "record", and "pause" to facilitate real-time control of the media streaming from the server to the client or from a client to the server. The same protocol elements may be used here as part of the new proposed concept to control the copy of data objects from the primary database to the secondary database. This may be performed because the data streaming protocol may be content agnostic.

The term "structure of a secondary database" may denote the internal optimization of the secondary database, (e.g., the structure of the tables and/or the structure of the records to be stored in the tables). Further metadata may be involved in the structure of the secondary database like partition definitions, security settings and so on. According to the proposed concept, the structures of the primary database and the secondary database should be identical after the copying process, such that there should be no identifiable structural or content difference between the primary and the secondary database.

The term "primary database" may denote the source for the copying process to the secondary database. The type of the primary database may be a relational database, a hierarchically organized database or a database organization being optimized for MapReduce organizations. However, other types of databases, such as object-oriented databases, simple file system based ISAM data structures, or others may be possible.

The term "control and monitoring module" may denote a processing unit enabled to differentiate between data objects of a working set of transfer objects which may be built and maintained and in which all transfer objects may be contained. Thereby, each transfer object ID (i.e., each data object to be transferred) is associated with a status indicator having any of the values: (S)=selected, (Q)=queued, (R)=running, (F)=finished, and (E)=error. Furthermore, the control and monitoring module may also be instrumental for the prioritization of data objects to be transferred from the primary database to the second database, (e.g., also in real time based on conditions).

The term "log sequence number" (LSN) may typically denote an integer number and, in addition, may include a timestamp, indicating the order in which changes were made to a database. Hence, a higher log sequence number may typically indicate a later change in the database. A related log sequence record may comprise additional metadata describing types of changed items in the record that have been changed, changed values, and so on.

In the following, a detailed description of the figures will be given. All instructions in the figures are schematic. An initial description of a block diagram of an embodiment of the inventive computer-implemented method for generating a copy of a database using a data streaming protocol is presented, followed by further embodiments including the database copying system for generating a copy of a database using a data streaming protocol.

Before turning to the figures, an overview description of one embodiment of the present invention is presented. The one embodiment includes the parallel transfer of smaller portions of data as opposed to typical database transfers when moving data objects from the primary database to the secondary database to efficiently build a standby, a local copy, a backup, or similar system.

In the following, a "smaller portion of data" will be denoted as "transfer object," "data object," or simply "object", whereas each object is represented by a unique identifier (ID). Such an object could be, for instance, a database tablespace.

Each writing database transaction, such as insert, update, and delete is recorded in database log entries and each change is associated with a log sequence number (LSN). The LSN is an ever-increasing number/counter, being unique to each write transaction. LSNs are tracked both at the database level and on specific data objects at an object level. Therefore, one can think of the object level LSN as being an object version number, indicating the time of the last modification to a given object.

Replaying transactions on the secondary database is based on applying database log entries. In order to receive the version/age of a transfer object on the secondary database system and to check its replay status against the primary system, the LSNs are taken into account. If the transfer object's LSN on the secondary database system is the same the LSN of the primary object at the time of the check the corresponding object is in a correct representation (version, age) on the secondary database system.

FIG. 1 depicts a block diagram of an embodiment of the computer-implemented method 100 for generating a copy of a database. The database may be a relational database using a data streaming protocol and, in particular, a real-time data streaming protocol. The method 100 includes setting up a structure of a secondary database identical to the primary database (step 102). For performing the setup, a data definition language may be used, for example, to define data tables, dependencies between tables of data objects, and so on. In non-relational databases, other data structures may be defined. The process to define the structure of the secondary database may be a manual process, a fully automated process, or a semi-automated process.

Process 100 (also referred to as method 100) also includes prioritizing data objects to be copied from a primary database to the secondary database in order to optimize the speed of the copy process (step 104). For the prioritization of data objects, the optimization can be made dependent on a variety of categories, such as the size of the data object, historic data (i.e., a copy), and/or a predefined order of the data objects. The parallelization of the copying of the data objects using the streaming data protocol can be made dependent on measurement, dependent on workload, or for example, dependent on the hosts for the primary and/or the secondary database, in order to support the self-tuning effect.

Furthermore, process 100 includes copying data objects (e.g., in portions such as a tablespace, a record, a single or a partial table, database pages, data blocks, index data, etc.) from the primary database to the secondary database using a data streaming protocol typically comprises parallel data streams of data objects (step 106).

Additionally, process 100 includes restoring data corresponding to the data object in the secondary database in parallel to the copying data objects from the primary database to the secondary database (step 108). The restoring data and copying data object activities may be executed concurrently without any interference.

Moreover, process 100 includes applying changes made to the data corresponding to the data object in the primary database during the time of copying of the data object to corresponding items in the secondary database (step 110), after the data object has been copied. A known method of database synchronizing may be used to update changes made.

Process 100 also includes provisioning ("making available"), the secondary database for usage (step 112), once all data objects have been copied from the primary database to the secondary database, creating a usable copy of the primary database. In some embodiments, provisioning includes starting, activating, opening, initiating, and/or initializing, etc., the secondary database. The secondary database may also be denoted as a standby database and can be used as a performance enhancer (i.e., accelerator database) or a local copy. However, such use cases may only be activated after the secondary database has been made available for use by synchronizing data with the primary database, because otherwise the referential integrity of the secondary database cannot be guaranteed during the copying process.

Figure 2A:
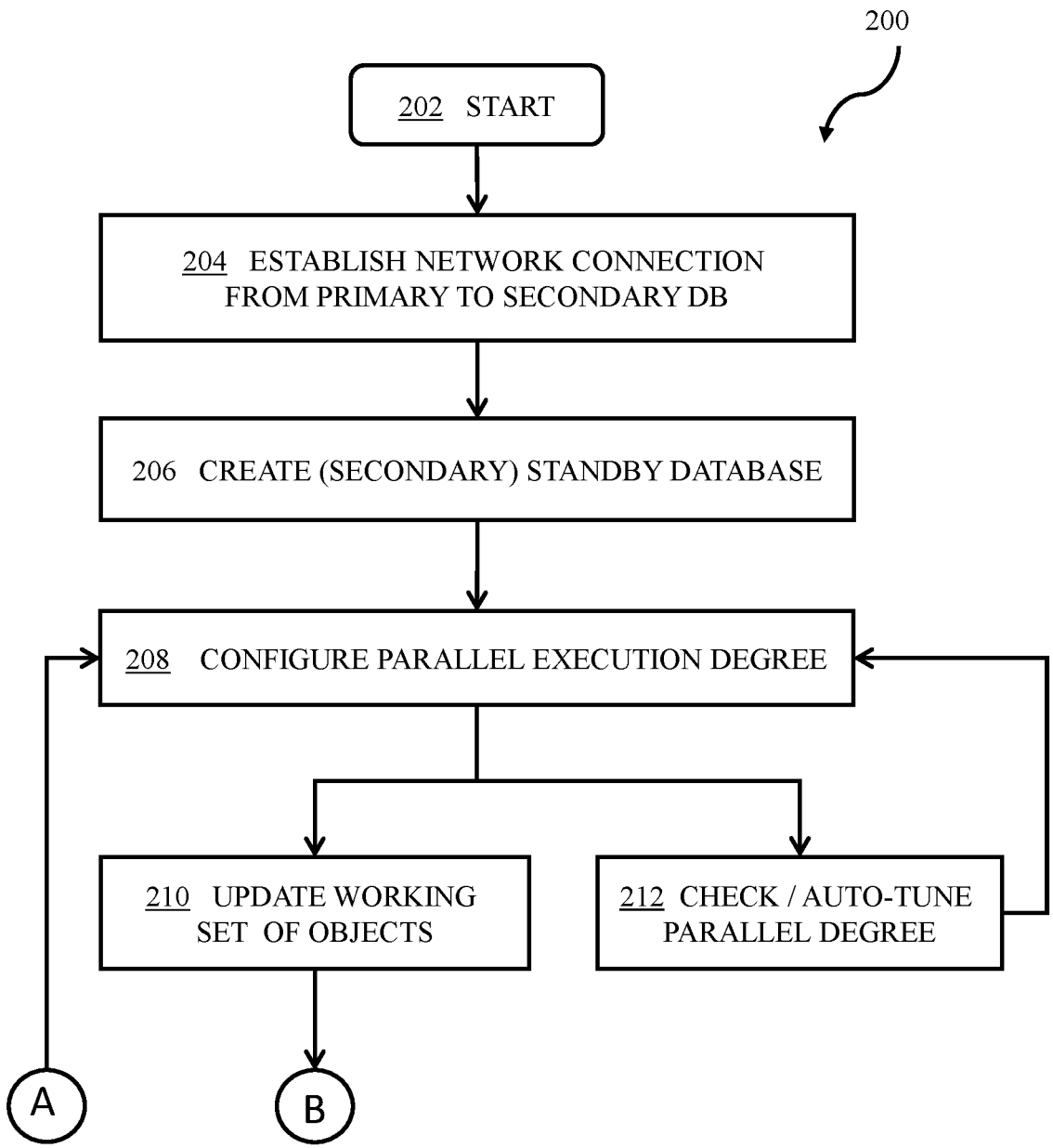
FIG. 2A depicts a flowchart of an embodiment of the overall process for object transfers from the primary database to the secondary database.
Figure 2B:
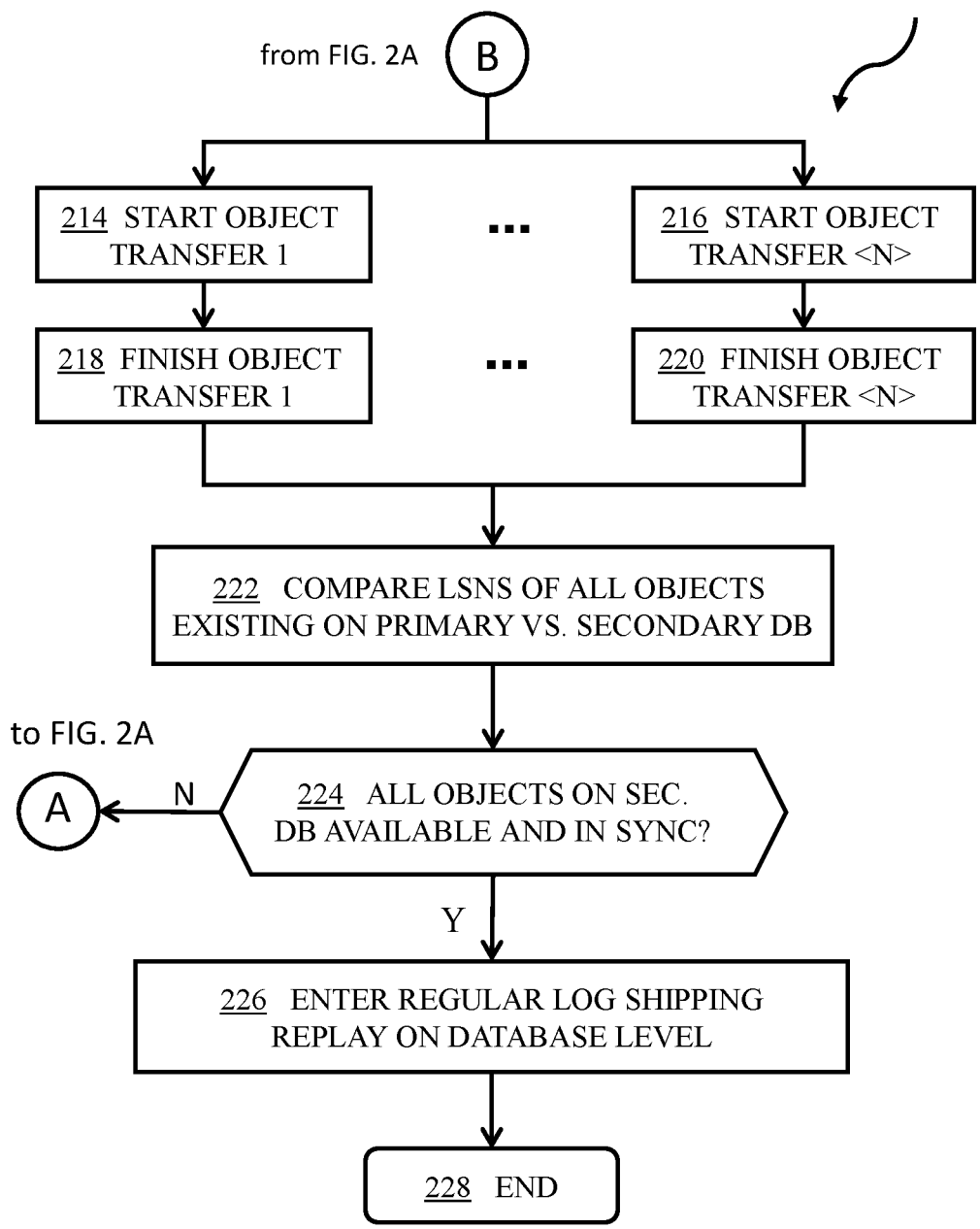
FIG. 2B depicts a flowchart of an embodiment of the overall process for object transfers from the primary database to the secondary database.

FIG. 2A and FIG. 2B show a flowchart of an example implementation embodiment of the overall process for object transfers from the primary database to the secondary database. In FIG. 2A the process starts at step 202 and proceeds to continue setting up a network connection (step 204) between the primary and secondary database system. The network connection enables the transfer of objects and log entries from the primary database to the secondary database and includes status checking of the transfer process.

In step 206, the process creates the secondary database on the secondary host system. The secondary database is created as an empty shell that follows the same layout and major parts of configuration as the primary database. If the database does not exist (i.e., has not yet been manually created), it could also be created automatically.

An essential part of optimizing the procedure of efficiently creating the secondary database includes the parallel copy execution of multiple objects. The degree of parallel execution is defined between 0 and <n>, whereas <n> represents the maximum number of transfer objects that are available on the primary database. A degree of "0" means that no objects are to be scheduled for transfer. In step 208, configuration of the parallel execution degree can be adapted dynamically. New data objects are immediately scheduled for transfer execution as a result of increasing the parallel execution degree, whereas running transfers will be allowed to finish execution if the parallel execution degree is decreased, but no new transfers are scheduled until the number of running transfers drops below the defined degree.

An adjustment of parameters for the parallel execution degree is possible manually. However, an automatic adaption (self-tuning, based on the workload of the system) can also be implemented.

At step 210, a working set of transfer data objects (or simply objects) is built and maintained, comprising all transfer objects. Each transfer object ID is associated with a status indicator which can relate to the following statuses:

- (S) Scheduled: Object transfer has not yet started but will be taken into account for the next cycle of transfer cycles;
- (Q) Queued: Object transfer has not yet started and will not be considered for the next cycle of transfer cycles (i.e., paused object). Objects scheduled for transfer remain in queue or in a paused state if the parallel execution degree is set to zero (0).
- (R) Running: the data object is part of an active transfer process;
- (F) Finished: the transfer of a data object finished successfully and has entered the status of regular replay of transactions;
- (E) Error: an error condition occurred.

Entries in the working set receive an enhanced priority level, allowing the working set data objects to be started before other data objects. In some embodiments, the priority level is pre-calculated and may be based on the data object size as an indicator, but priority can also be manually adjusted. Additionally, other methods of determining the priority level are also possible, e.g., based on a size of said data object, a structure of the data object, a predefined order based on a characteristic of said data object and analysis data of historic copy processes.

An example structure used in the control the object transfers may look like the following:

TABLE 1

| Transfer Object ID | Status Indicator | Priority Level |
|---|---|---|

Example: Given that the parallel execution degree is set to "2", the two objects with the highest priority would be scheduled first.

TABLE 2

| Transfer Object ID | Status Indicator | Priority Level |
|---|---|---|
| 0 | S | 50 |
| 1 | S | 100 |
| 2 | Q | 20 |
| 3 | Q | 20 |
| ... | ... | ... |

Based on the example priority levels depicted in Table 2, objects 0 and 1 would be executed for data object transfer first.

TABLE 3

| Transfer Object ID | Status Indicator | Priority Level |
|---|---|---|
| 0 | R | 50 |
| 1 | R | 100 |
| 2 | S | 20 |
| 3 | S | 20 |
| ... | ... | ... |

Continuing with the above example, the transfer of data objects 0 and 1 would be followed by the transfer of data objects 2 and 3 in the next cycle of transfers as depicted in Table 3. Table 4 indicates the finished status for data objects 0 and 1 and the running transfer status of data objects 3 and 4.

TABLE 4

| Transfer Object ID | Status Indicator | Priority Level |
|---|---|---|
| 0 | F | 50 |
| 1 | F | 100 |
| 2 | R | 20 |
| 3 | R | 20 |
| ... | ... | ... |

The parallel execution degree setting (configured in step 208) is checked on a regular basis in order to validate whether new or additional object transfers can be considered by setting their object status indicator from (Q) Queued to (S) Scheduled.

The execution degree can be changed manually since the last check or the execution degree may have adapted automatically (e.g., based on the current workload of the (host) system). In step 212, an automatic setting checks the workload of the system and provides auto-tuning of the parallel execution degree setting. Determining the availability of free system resources, such as CPU time, memory capacity, etc., may result in increasing the parallel execution degree, and detection of overloaded resources may result in the parallel execution degree being decreased. The interval of checking the changes of the execution degree can be configured. Furthermore, the priority level of data objects may be altered.

It should also be understood that during run-time the copy priority of the data objects in the transfer queue can be changed, e.g., based on user interventions, measured workloads of the underlying host, transaction volume of the databases, or available network bandwidth between the primary database and the secondary database.

FIG. 2B depicts a continuation of flowchart 200 of FIG. 2A. The first step(s) 214, . . . , 216 follow step 210 of FIG. 2A, as indicated by path "B" and depict the initiation of the data object transfer. Steps 214 . . . to 216 depict the parallel transfer execution of data objects that have an associated status indicator (S) Scheduled. Subsequent to initiating the transfer of the data objects, a change occurs to the status indicator reflecting a running (R) status for the respective data objects. Additional details are included in the context of FIGS. 3A and 3B.

Steps 218 and 220 depict an end of the transfer of the data objects in which status indicators set to Running (R) are changed to a status of Finished (F). It should also be noted that a plurality of started object transfers can run in parallel depending on the configuration for the parallel execution (determined in FIG. 2A, step 208). The status change to finish object transfer can also occur in parallel as indicated by steps 218, . . . , 220.

Subsequent to the finish data object transfer steps, the log sequence number (LSN) of all data objects existing on the primary database are compared against the LSN of the corresponding objects transferred to the secondary (standby) database (step 222). The comparison is made by collecting and comparing the log sequence number (LSN) for each relevant object from the primary database and the secondary database.

In step 224, a determination is made whether the data objects transferred to the secondary database are available, not available (not transferred), synchronized with the corresponding primary database data object, or not yet synchronized. Objects are out of sync if the LSN of the primary database data object is more recent (i.e., typically larger) than the LSN of the secondary database data object. Objects are in sync if the LSN of the primary object is equal to the LSN of the secondary object. Determination of an out-of-sync or missing condition for data objects on the secondary database (step 224, "NO" branch) result in repeating the process of object transfer, proceeding to step 208, FIG. 2A (via connecting point "A" in FIG. 2B to connecting point "A" in FIG. 2A). Confirming that all transferred data objects on the secondary database exist and have been confirmed as in-sync (step 224, "YES" branch), the normal database replay mode can be entered (step 226).

Subsequent to all data objects having been successfully created, transferred, and synchronized on the secondary database, the system can switch to a database level replay of changes, which is its regular and permanent database replay mode (i.e., ongoing update or backup operations between the primary database and the secondary (standby) database). The efficient construction of a secondary database has been completed. The process ends at step 228.

Figure 3A:
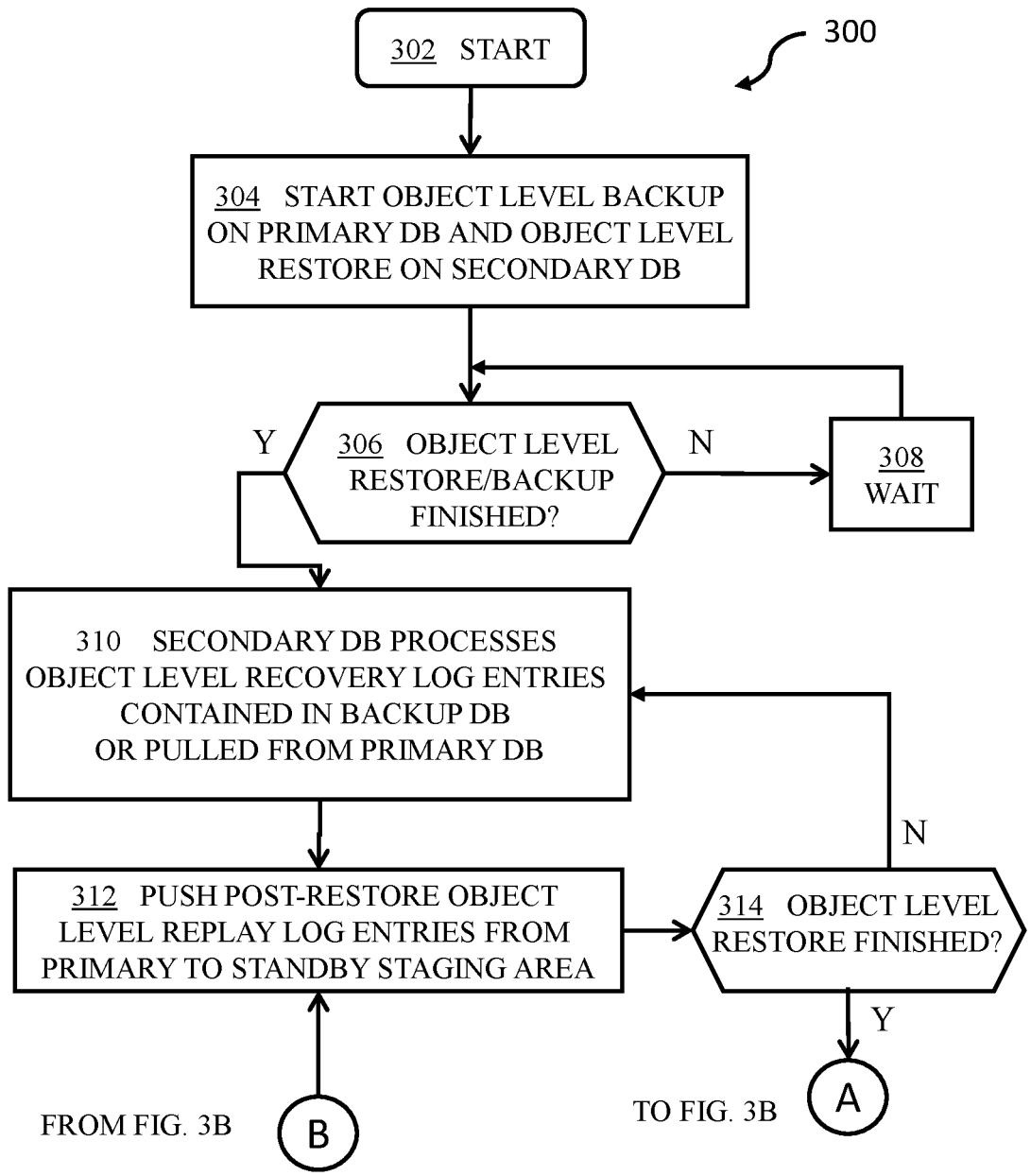
FIG. 3A depicts a flowchart of an embodiment of the more detailed process for object transfers.
Figure 3B:
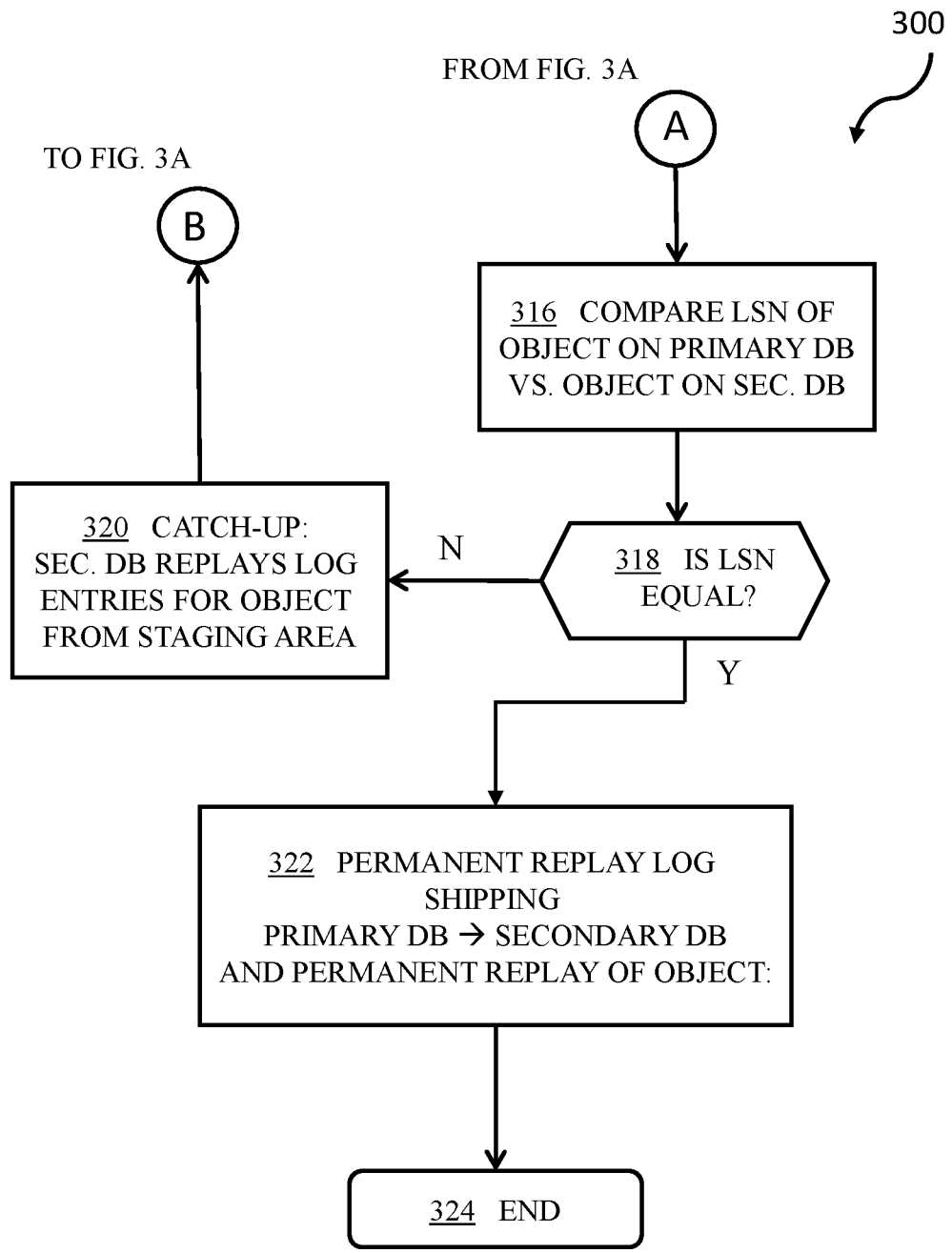
FIG. 3B depicts a flowchart of an embodiment of the more detailed process for object transfers.

FIGS. 3A and 3B depict a flowchart 300 of a more detailed implementation-level embodiment of the process for object transfers by tracing single data object transfer details, starting at step 302 (i.e., providing additional details associated with steps 214-step 220, FIG. 2B).

At the data object level, two different usage types of logs are defined for the recovery and replay activities, which includes: (1) recovery logs: referring to log entries that are generated on the primary database while the object level backup/restore operation is running; the recovery logs could be, but do not necessarily need to be, part of the backup image, and (2) replay logs: referring to log entries that are generated on the primary database after the object level backup/restore operation has been finished.

The transfer of a data object is initiated by the performance of an object level restore operation in the secondary database and an object level backup operation on the primary database (step 304). A network connection provides direct coupling of the restore and backup operations. (i.e., established connection performed in step 204, FIG. 2A).

The object level backup/restore operations are monitored to determine whether operations indicate a finished status (step 306). For the case in which a finished status of operations is not found (step 306, "NO" branch), the process includes a check interval of a wait period (step 308), which can be configured and in which monitoring continues. Subsequent to determining the backup/restore operations finished successfully (step 306, "YES" branch), the secondary database processes the data object level recovery log entries (step 310). The recovery log entries, which were generated during the object level restore operation, are replayed (i.e., performed) on the standby (i.e., secondary database) data object. The recovery logs have either already been transferred to the secondary database as part of the backup/ restore process or are drawn from the primary database on request. The replay of recovery logs on the data objects of the standby site can be referred to as the recovery logs usage.

Concurrent with determining the object-level restore has been completed successfully, the primary database pushes all the log entries that have been generated after the object level restore operation has been successfully completed on the standby database (step 312). The log entries pushed to the secondary database can be referred to as the replay log usage. The replay logs are temporarily stored in a staging area on the secondary database host and deleted when no longer needed.

The process determines the completion of the object level recover in step 314. Determining that the object level recovery is not complete (step 314, "NO" branch), the process returns to step 310 and accesses the recovery log entries stored on the secondary database or pulls the entries from the primary database. Subsequent to completion of object level recovery (step 314, "YES" branch), the catch-up replay starts, by replaying the logs that are stored in the standby's staging area, depicted via the link "A" from FIG. 3A to "A" on FIG. 3B.

The method performs a catch-up replay operation that checks and compares the object level LSNs of primary database to the corresponding object level LSNs of the secondary (standby) database (FIG. 3B, step 316). If the object level LSN of the primary DB is equals to the object level LSN of the secondary DB (step 318, "YES" branch), then performance of the catch-up replay is either not needed or has been successfully completed for a respective object, and the secondary DB can proceed to the permanent object replay operation (i.e., ongoing regular backup operations from the primary DB to the standby DB, step 322). If the object level LSNs of the primary database and standby database do not match (step 318, "NO" branch), the method initiates a catch-up replay operation or continues in-process catch-up replay operations, thus applying the replay logs stored in the standby's staging area to the standby object (step 320). Concurrently, the primary database continues to push replay logs to the standby staging area (continuation of step 312, FIG. 3A via "B" path from FIG. 3B, "B" path).

Subsequent to determining the object level LSNs between primary and secondary database match (step 318, "YES" branch), the replay process switches from catch-up replay to regular replay for the given object (step 322, i.e., regular ongoing backup replay log to update the standby DB with transaction changes made to the primary DB). During the regular replay operation, the primary database directly sends log entries to the secondary DB and the secondary DB replays the log entries as received on the respective object. Completion of the regular replay operation step successfully finishes the object level transfer to the standby DB. The process ends at step 324.

Figure 4A:
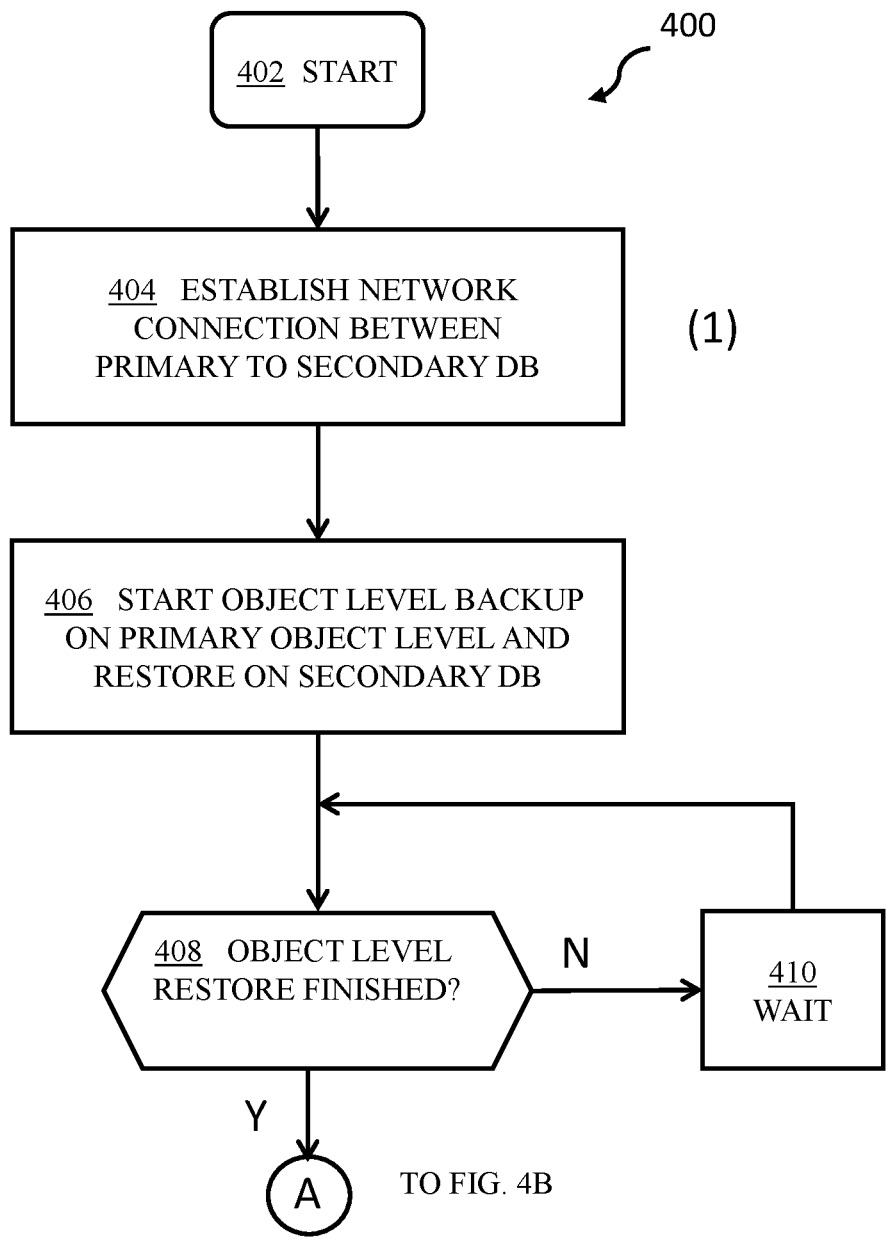
FIG. 4A depicts an exemplary flowchart of an embodiment with details of an alternative solution for single data object transfer.
Figure 4B:
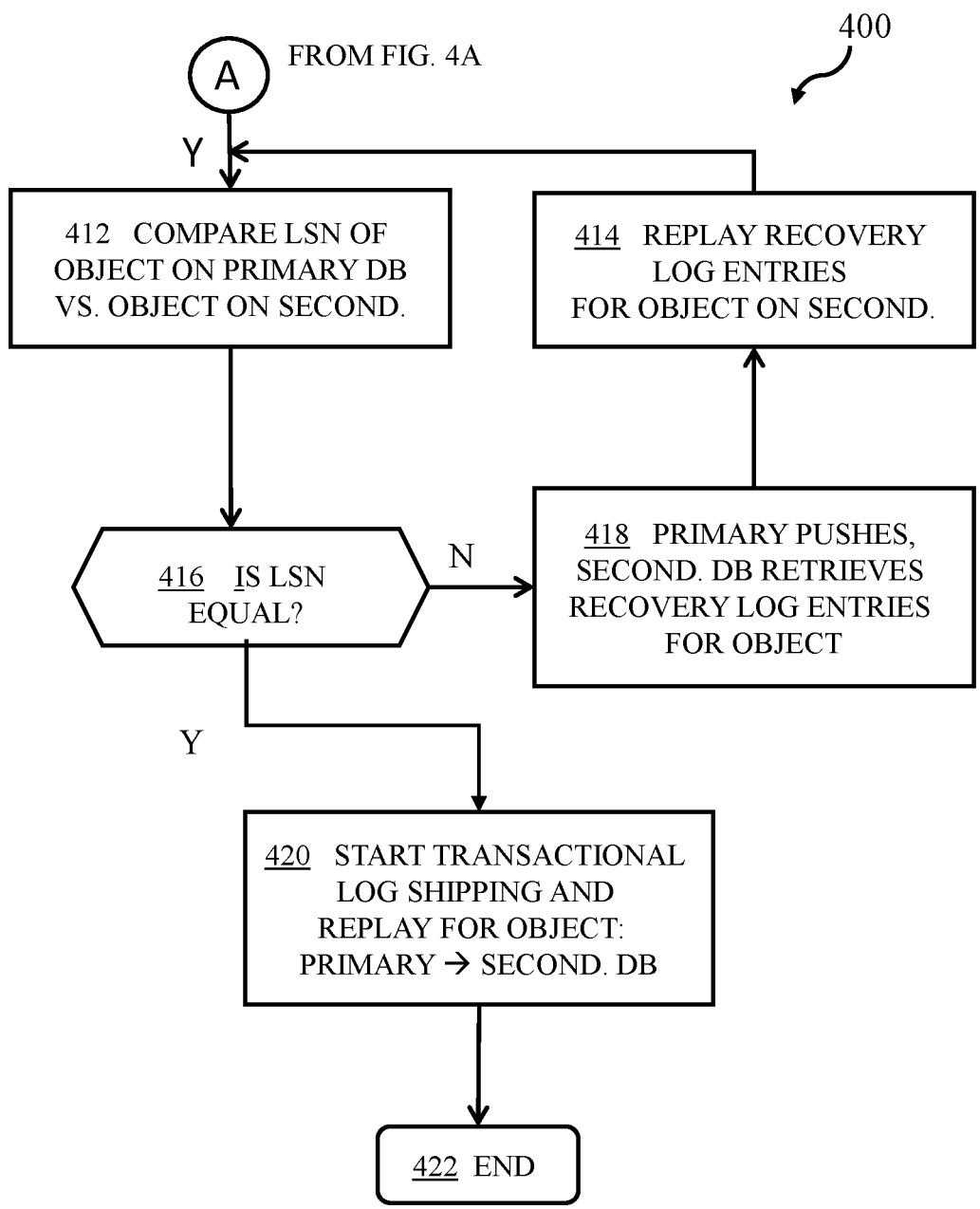
FIG. 4B depicts an exemplary flowchart of an embodiment with details of an alternative solution for single data object transfer.

FIGS. 4A and 4B depict an exemplary flowchart 400 of an embodiment for details of a single data object transfer. The process begins at step 402 and proceeds to establish the network connection (step 404), as described above with respect to step 204, FIG. 2A. In step 406, the object level backup is initiated at the primary object level and a restore is performed on the secondary DB (e.g., the standby DB).

A regular determination is performed as to whether the data object level restore is complete (step 408). For the case in which the object level restore is not complete (step 408, "NO" branch), a wait operation is initiated (step 410) and the process subsequently proceeds to determine whether the object level restore is complete (step 408). For the case in which the object level restore operation is determined to be complete (step 408, "YES" branch), the process continues via path "A" of FIG. 4B which depicts a continuation of the flowchart 400.

The process performs comparisons of the LSNs of the objects of the primary DB and the standby (secondary) DB (step 412), similar to the operation performed in step 316, FIG. 3B. The process determines whether the compared LSNs are equal between data object of the primary DB and the standby DB (step 416). If the LSNs are determined to not be equal (step 416, "NO" branch), the process continues to step 418 in which the primary DB pushes a data object, and the secondary database retrieves the recovery log entries for the data object. The retrieved recovery logs entries are replayed in the secondary DB (step 414), and the process loops back to compare the object level LSNs between the primary and standby DBs (return to step 412), and the comparison result of whether the object level LSN of the data object of the primary DB equals (matches) the object level LSN of the data object of the standby DB.

For the case in which the object level LSNs between primary and secondary database match (step 416 "YES" branch), the replay process switches from catch-up replay to regular replay (i.e., ongoing backup operations) for the respective object (step 420). In step 420, the primary database performs transactional log shipping, sending log entries for the respective object directly to the secondary DB. The secondary DB replays the log entries as received on the respective object, 420. Completion of step 420 indicates that the object level transfer is considered successfully finished. The process ends at 422.

Figure 5:
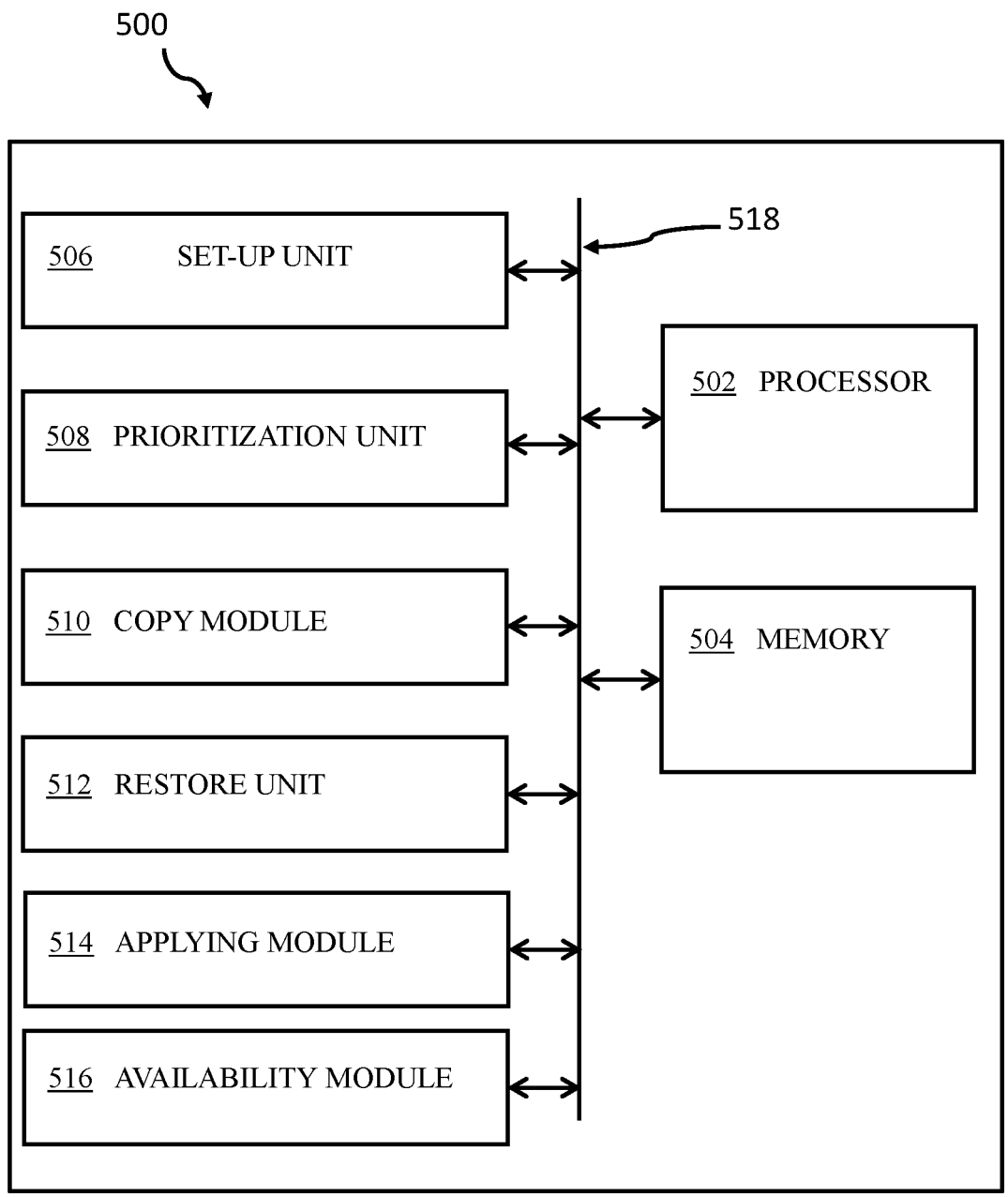
FIG. 5 depicts a block diagram of an embodiment of a database copying system for generating a copy of a database using a data streaming protocol.

FIG. 5 depicts a block diagram of an embodiment of a database copying system 500 for generating a copy of a database using a data streaming protocol. The system comprises a processor 502 and a memory 504, wherein the memory 504 is communicatively coupled to the processor 502, and wherein the memory stores program code portions that, when executed, enable the processor 502, to perform a set up operation creating a structure of a secondary database (i.e., standby database) via a set-up unit 506, identical to the primary database, and to prioritize, by way of a prioritization unit 508, data objects to be copied from a primary database to the secondary database.

The processor is also enabled when executing the program code portions to copy data objects via a copy module 510. Copy module 510 copies data objects from the primary database to the secondary database using a data streaming protocol. The processor also restores data corresponding to the data object in the secondary database in parallel to the copying data objects from the primary database to the secondary database via the restore unit 512.

The processor is also enabled, when executing the program code portions, to apply, via an applying module 514, changes made to the data corresponding to the data object in the primary database during the time of copying of the data object to corresponding elements in the secondary database, after the data object has been copied, and to make available, via the availability module 516, the secondary database for use once all data objects have been copied from the primary database to the secondary database so that a usable copy of the primary database is created.

It shall also be mentioned that all functional units, modules and functional blocks, including the processor 502, the memory 504, the set-up unit, 506, the prioritization unit 508, the copy module 510, the restore unit 512, the applying module 514, and the availability module 516, may be communicatively coupled to one another for signal or message exchange in a selected 1:1 manner. Alternatively, the functional units, modules and functional blocks can be linked to a system internal bus system 518 for a selective signal or message exchange.

Figure 6:
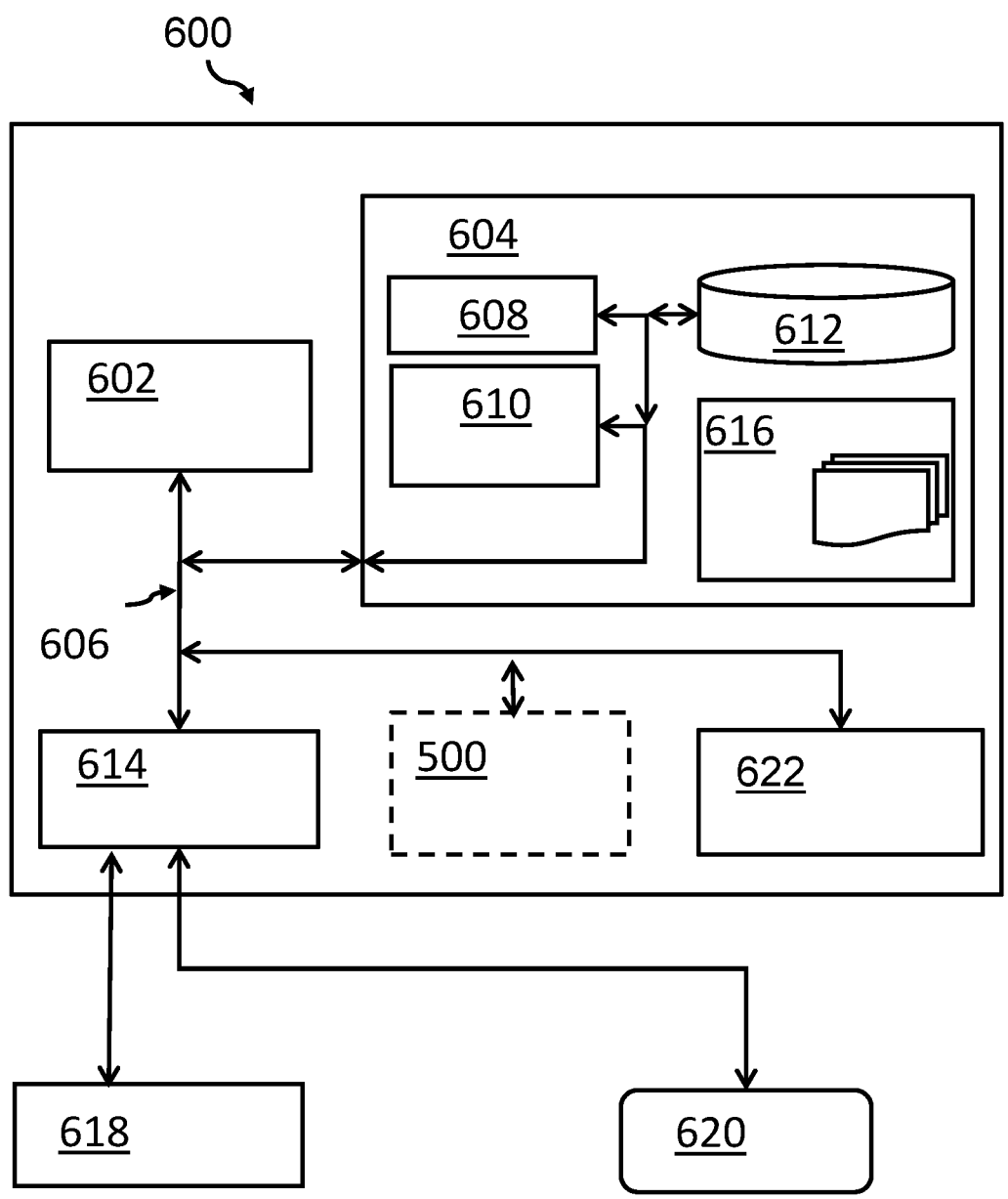
FIG. 6 depicts an embodiment of a computing system comprising the system according to FIG. 5.

Embodiments of the invention may be implemented together with virtually any type of computer, regardless of the platform being suitable for storing and/or executing program code. FIG. 6 depicts, as an example, a computing system 600 suitable for executing program code related to the proposed method.

The computing system 600 is only one example of a suitable computer system and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general-purpose or special-purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is presented in the form of a general-purpose computing device. The components of computer system/server 600 may include, but are not limited to, one or more processors or processing units 602, system memory 604, and bus 606 that couple various system components including system memory 604 to processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the database copying system 500 for generating a copy of a database using a data streaming protocol may be attached to the bus system 606.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The inventive concept may be summarized by the following clauses:

1. A computer-implemented method for generating a copy of a database using a data streaming protocol, the method comprising
    setting up a structure of a secondary database identical to a primary database,
    prioritizing data objects to be copied from the primary database to the secondary database,
    copying data objects from the primary database to the secondary database using a data streaming protocol for the prioritized data objects,
    restoring data corresponding to the data objects in the secondary database in parallel to the copying data objects from the primary database to the secondary database,
    applying changes made to the data corresponding to the data object in the primary database during the time of copying of the data object to corresponding elements in the secondary database, after the data object has been copied, and
    making available the secondary database for use once all data objects have been copied from the primary database to the secondary database so that a usable copy of the primary database is created.
2. The method according to clause 1, wherein the data streaming protocol is adapted for copying a plurality of data objects in parallel.
3. The method according to clause 1 or 2, wherein the prioritization is based on one selected out of the group consisting of a size of the data object, a structure of the data object, a predefined order based on a characteristic of the data object and analysis data of historic copy processes.
4. The method according to any of the preceding clauses, wherein the prioritization of data objects uses a control and monitoring module.
5. The method according to any of the preceding clauses, wherein the applying the changes to the data corresponding to the data object in the primary database is based on a comparison of corresponding log sequence numbers of the data object in the primary database and the secondary database.
6. The method according to any of the preceding clauses, wherein a degree of parallelization of the copying of data objects is configurable.
7. The method according to clause 6, wherein the configuration of the degree of parallelization is determined based on a workload of the primary database.
8. The method according to clause 6, wherein the configuration of the degree of parallelization is determined based on a workload of the secondary database and/or a capacity of a network connection between the primary database and the secondary database.
9. The method according to any of the preceding clauses, also comprising
    establishing a network connection between a primary host of the primary database and a secondary host of the secondary database.
10. The method according to any of the preceding clauses, wherein the primary and the secondary database is one selected out of the group consisting of a relational database, an object database, a hierarchical database, and a database based on MapReduce techniques.
11. The method according to any of the preceding clauses, wherein a number of parallel streams of the data streaming protocol is determined prior to a start of the copying.
12. The method according to any of the preceding clauses, also comprising
    monitoring the status of the copying the data objects according to a predefined status schema.
13. A database copying system for generating a copy of a database using a data streaming protocol, the system comprising a processor and a memory, the memory communicatively coupled to the processor, wherein the memory stores program code portions that, when executed, enable the processor, to set up a structure of a secondary database identical to a primary database, prioritize data objects to be copied from the primary database to the secondary database, copy data objects from the primary database to the secondary database using a data streaming protocol for the prioritized data objects, restore data corresponding to the data objects in the secondary database in parallel to the copying data objects from the primary database to the secondary database, apply changes made to the data corresponding to the data object in the primary database during the time of copying of the data object to corresponding elements in the secondary database, after the data object has been copied, and make available the secondary database for usage once all data objects have been copied from the primary database to the secondary database so that a usable copy of the primary database is created.

14. The system according to clause 13, wherein the data streaming protocol is adapted for copying a plurality of data objects in parallel.

15. The system according to clause 13 or 14, wherein the prioritization is based on one selected out of the group consisting of a size of the data object, a structure of the data object, a predefined order based on a characteristic of the data object and analysis data of historic copy processes.

16. The system according to any of the clauses 13 to 15, also comprising a control and monitoring module adapted for a prioritization of data objects.

17. The system according to any of the clauses 13 to 16, wherein the program code portions enable the processor during the applying the changes to the data corresponding to the data object in the primary database and also based on a comparison of corresponding log sequence numbers of the data object in the primary database and the secondary database.

18. The system according to any of the clauses 13 to 17, wherein a degree of parallelization of the copying of data objects is configurable.

19. The system according to clause 18, wherein the configuration of the degree of parallelization is determined based on a workload of the primary database.

20. The system according to clause 18, wherein the configuration of the degree of parallelization is determinable based on a workload of the secondary database and/or a network connection between the primary database and the secondary database.

21. The system according to any of the clauses 13 to 20, wherein the program code portions enable the processor also to establish a network connection between a primary host of the primary database and a secondary host of the secondary database.

22. The system according to any of the clauses 13 to 21, wherein the primary and the secondary database is one selected out of the group consisting of a relational database, an object database, a hierarchical database, and a database based on MapReduce techniques.

23. The system according to any of the clauses 13 to 22, wherein a number of parallel streams of the data streaming protocol is determinable prior to a start of the copying.

24. The system according to any of the clauses 13 to 23, wherein the program code portions enable the processor to monitoring the status of the copying the data objects according to a predefined status schema.

25. A computer program product for generating a copy of a database using a data streaming protocol database, the computer program product comprising a computer readable storage medium having program instructions embodied therewith, the program instructions being executable by one or more computing systems or controllers to cause the one or more computing systems to set up a structure of a secondary database identical to a primary database, prioritize data objects to be copied from the primary database to the secondary database, copy data objects from the primary database to the secondary database using a data streaming protocol for the prioritized data objects, restore data corresponding to the data objects in the secondary database in parallel to the copying data objects from the primary database to the secondary database, apply changes made to the data corresponding to the data object in the primary database during the time of copying of the data object to corresponding elements in the secondary database after the data object has been copied, and making available the secondary database for usage once all data objects have been copied from the primary database to the secondary database so that a usable copy of the primary database is created.

26. A computer-implemented method for generating a copy of a database using a data streaming protocol, the method comprising:

creating, by one or more computer processors, a secondary database including a structure identical to a primary database;

prioritizing, by the one or more computer processors, data objects of the primary database to be copied to said secondary database;

configuring, by the one or more computer processors, a degree of parallel copy execution of a data streaming protocol;

copying, by the one or more computer processors, said prioritized data objects of said primary database to said secondary database by said data streaming protocol that includes a parallel copy execution of multiple data objects of said prioritized data objects based on said configured degree;

restoring, by the one or more computer processors, said data objects in said secondary database in parallel to said copying data objects from said primary database to said secondary database;

applying, by the one or more computer processors, changes made to said data objects in said primary database during copying of said data objects to said copied data objects in said secondary database; and activating, by the one or more computer processors, said secondary database as a duplicate of said primary database, subsequent to copying, restoring, and applying changes of all data objects from said primary database to said secondary database.

27. A computer-implemented method for generating a copy of a database using a data streaming protocol, the method comprising:
creating, by one or more computer processors, a secondary database including a structure identical to a primary database;
prioritizing, by the one or more computer processors, data objects of the primary database to be copied to said secondary database;
determining, by the one or more processors, a current workload of said primary database;
configuring, by the one or more computer processors, a degree of parallel copy execution of a data streaming protocol, based on said workload of said primary database;
copying, by the one or more computer processors, said prioritized data objects of said primary database to said secondary database by said data streaming protocol that includes a parallel copy execution of multiple data objects of said prioritized data objects based on said configured degree;
restoring, by the one or more computer processors, said data objects in said secondary database in parallel to said copying of said data objects from said primary database to said secondary database;
applying, by the one or more computer processors, changes made to said data objects in said primary database during copying of said data objects to said secondary database, based on a comparison of the log sequence numbers (LSNs) of said data objects of the primary database and said data objects copied to said secondary database; and
activating, by the one or more computer processors, said secondary database as a duplicate of said primary database, subsequent to copying, restoring, and applying changes of all data objects from said primary database to said secondary database.

What is claimed is:

1. A computer-implemented method for generating a copy of a database using a data streaming protocol, the method comprising:
setting up, by one or more computer processors, a structure of a secondary database identical to a primary database;
configuring, by the one or more computer processors, parallel execution degrees of data objects to be copied from said primary database to said secondary database;
building, by the one or more computer processors, a working set of data objects to be copied from said primary database to said secondary database;
prioritizing, by the one or more computer processors, data objects in said working set of data objects to be copied from said primary database to said secondary database over other data objects;
copying, by the one or more computer processors, data objects in parallel from said primary database to said secondary database using a data streaming protocol for said prioritized data objects;
restoring, by the one or more computer processors, data corresponding to said data objects in said secondary database in parallel to said copying data objects from said primary database to said secondary database;
applying, by the one or more computer processors, changes made to said data corresponding to said data object in said primary database during said copying of said data object to corresponding elements in said secondary database, after said data object has been copied; and
activating, by the one or more computer processors, said secondary database for use as a duplicate of said primary database, subsequent to copying, restoring, and applying changes of all data objects from said primary database to said secondary database.

2. The method according to claim 1, wherein said data streaming protocol is adapted for copying a plurality of data objects in parallel.

3. The method according to claim 1, wherein said prioritization is based on a selection from a group consisting of: a size of said data object, a structure of said data object, a predefined order based on a characteristic of said data object and analysis data of historic copy processes.

4. The method according to claim 1, wherein said prioritization of said data objects uses a control and monitoring module.

5. The method according to claim 1, wherein said applying said changes to said data corresponding to said data object in said primary database is based on a comparison of corresponding log sequence numbers of said data object in said primary database and said secondary database.

6. The method according to claim 1, wherein a degree of parallelization of said copying of data objects is configurable.

7. The method according to claim 1, further comprising:
establishing, by the one or more computer processors, a network connection between a primary host of said primary database and a secondary host of said secondary database.

8. The method according to claim 1, wherein said primary and said secondary database are
selected from a group consisting of a relational database, an object database, a hierarchical database, and a database based on MapReduce techniques.

9. The method according to claim 1, wherein a number of parallel streams of said data streaming protocol is determined prior to a start of said copying.

10. The method according to claim 1, further comprising:
monitoring, by the one or more computer processors, status of said copying said data objects according to a predefined status schema.

11. A computer system for generating a copy of a database using a data streaming protocol, said computer system comprising: one or more processors; one or more computer readable storage media communicatively coupled to said one or more processors, wherein said one or more computer readable storage media includes program instructions embodied therewith, said program instructions executable by said one or more processors to cause said one or more processors to: set up a structure of a secondary database identical to a primary database; configure parallel execution degrees of data objects to be copied from said primary database to said secondary database; build a working set of data objects to be copied from said primary database to said secondary database; prioritize data objects in said working set of data objects to be copied from said primary database to said secondary database over other data objects; copy data objects in parallel from said primary database to said secondary database using a data streaming protocol for said prioritized data objects; restore data corresponding to said data objects in said secondary database in parallel to said copying data objects from said primary database to said secondary database; apply changes made to said data corresponding to a first data object of said data objects in said primary database during said copying of said first data object to corresponding elements in said secondary database, after said first data object has been copied; and activate said secondary database for use as a duplicate of said primary database, subsequent to said copy, said restore, and said apply of changes of all data objects from said primary database to said secondary database.

12. The computer system according to claim 11, wherein said data streaming protocol is adapted for copying a plurality of data objects in parallel.

13. The computer system according to claim 11, wherein said prioritization is based on a selection from a group consisting of: a size of said data object, a structure of the data object, a predefined order based on a characteristic of said data object and analysis data of historic copy processes.

14. The computer system according to claim 11, further comprising a control and monitoring module adapted for a prioritization of data objects.

15. The computer system according to claim 11, wherein said program instructions enable said one or more processors during said applying said changes to said data corresponding to said first data object in said primary database and also based on a comparison of corresponding log sequence numbers of said first data object in said primary database and said secondary database.

16. The computer system according to claim 11, wherein a degree of parallelization of said copying of data objects is configurable.

17. The computer system according to claim 16, wherein said configuration of said degree of parallelization is determined based on a workload of said primary database.

18. The computer system according to claim 16, wherein said configuration of said degree of parallelization is determinable based on a workload of said secondary database and/or a network connection between said primary database and said secondary database.

19. The computer system according to claim 11, wherein said program instructions enable said one or more processors to establish a network connection between a primary host of said primary database and a secondary host of said secondary database.

20. The computer system according to claim 11, wherein said primary and said secondary database is selected from a group consisting of: a relational database, an object database, a hierarchical database, and a database based on MapReduce techniques.

21. The computer system according to claim 11, wherein a number of parallel streams of said data streaming protocol is determinable prior to a start of said copying.

22. The computer system according to claim 11, wherein said program instructions enable said one or more processors to monitor status of said copying said data objects according to a predefined status schema.

23. A computer program product for generating a copy of a database using a data streaming protocol database, said computer program product comprising:
a computer readable storage medium having program instructions embodied therewith, said program instructions being executable by one or more computer processors to cause said one or more computer processors to:
set up a structure of a secondary database identical to a primary database;
configure parallel execution degrees of data objects to be copied from said primary database to said secondary database;
build a working set of data objects to be copied from said primary database to said secondary database;
prioritize data objects in said working set of data objects to be copied from said primary database to said secondary database over other data objects;
copy data objects from said primary database to said secondary database using a data streaming protocol for said prioritized data objects;
restore data corresponding to said data objects in said secondary database in parallel to said copying data objects from said primary database to said secondary database;
apply changes made to said data corresponding to a first data object of said data objects in said primary database during said copying of said first data object to corresponding elements in said secondary database, after said first data object has been copied; and
activate said secondary database for use as a duplicate of said primary database subsequent to said copy, said restore, and said apply of changes of all data from said primary database to said secondary database.

24. A computer-implemented method for generating a copy of a database using a data streaming protocol, the method comprising:
creating, by one or more computer processors, a secondary database including a structure identical to a primary database;
prioritizing, by the one or more computer processors, data objects of the primary database to be copied to said secondary database;
configuring, by the one or more computer processors, a degree of parallel copy execution of a data streaming protocol;
refining the degree of parallel copy execution of the data streaming protocol to validate additional object transfers based on availability of system resources at regular intervals;
copying, by the one or more computer processors, said prioritized data objects of said primary database to said secondary database by said data streaming protocol that includes a parallel copy execution of multiple data objects of said prioritized data objects based on said configured degree;
restoring, by the one or more computer processors, said data objects in said secondary database in parallel to said copying data objects from said primary database to said secondary database;
applying, by the one or more computer processors, changes made to said data objects in said primary database during copying of said data objects to said copied data objects in said secondary database; and
activating, by the one or more computer processors, said secondary database as a duplicate of said primary database, subsequent to copying, restoring, and applying changes of all data objects from said primary database to said secondary database.

25. A computer-implemented method for generating a copy of a database using a data streaming protocol, the method comprising:
creating, by one or more computer processors, a secondary database including a structure identical to a primary database;
prioritizing, by the one or more computer processors, data objects of the primary database to be copied to said secondary database;

determining, by the one or more processors, a current workload of said primary database;

configuring, by the one or more computer processors, a degree of parallel copy execution of a data streaming protocol, based on said workload of said primary database;

refining, by the one or more processors, the degree of parallel copy execution of the data streaming protocol to validate additional object transfers based on availability of system resources at regular intervals of said primary database;

copying, by the one or more computer processors, said prioritized data objects of said primary database to said secondary database by said data streaming protocol that includes a parallel copy execution of multiple data objects of said prioritized data objects based on said configured degree;

restoring, by the one or more computer processors, said data objects in said secondary database in parallel to said copying of said data objects from said primary database to said secondary database;

applying, by the one or more computer processors, changes made to said data objects in said primary database during copying of said data objects to said secondary database, based on a comparison of the log sequence numbers (LSNs) of said data objects of the primary database and said data objects copied to said secondary database; and activating, by the one or more computer processors, said secondary database as a duplicate of said primary database, subsequent to copying, restoring, and applying changes of all data objects from said primary database to said secondary database.

* * * * *